DEVICE RESPONDING TO THE DIFFERENCE BETWEEN TWO INPUT SIGNALS

Filed Oct. 21, 1957

INVENTORS
PIETER JOHANNES WILHELMUS JOCHEMS
HEINE ANDRIES RODRIGUES DE MIRANDA
BY
Frank R. Jifari
AGENT United States Patent Office 3,001,088
Patented Sept. 19, 1961

3,001,088

DEVICE RESPONDING TO THE DIFFERENCE BETWEEN TWO INPUT SIGNALS

Pieter Johannes Wilhelmus Jochems and Heine Andries Rodrigues de Miranda, both of Eindhoven, Netherlands, assignors to North American Philips Company, Inc., New York, N.Y., a corporation of Delaware Filed Oct. 21, 1957, Ser. No. 691,487
Claims priority, application Netherlands Nov. 27, 1956
10 Claims. (Cl. 307—88.5)

This invention relates to devices comprising two transistors, each of which has supplied to it an input signal; the output signal produced in a common collector circuit is indicative of whether the difference between the two input signals, measured in an absolute sense, exceeds a prescribed value. The object of the invention is to provide a device for adding information given in binary code, but it may alternatively serve, for example, in automatic telephony for stopping a selector at the moment when a voltage which is active as the one input signal and derived from the test wiper of the selector differs less than a given amount from a numerical adjusted voltage which is active as the other input signal.

The device according to the invention is characterized in that the input electrodes of the transistors which are not connected to the signal sources are connected together so that, if the difference between the input signals exceeds the prescribed value, the input electrodes of one one transistor are operated in the forward direction due to the fact that the breakdown voltage between the input electrodes of the other transistor is exceeded.

For manufacturing the transistors, use may be made of the diffusion-base process as is known per se for high frequency transistors, in which by suitable choice of the specific resistances of the collector layer and the base layer obtained by diffusion, at least as measured in the vicinity of the collector-base junction and the emitter-base junction respectively, it may be achieved that the collector-base breakdown voltage is considerably higher than the emitter base breakdown voltage (the emitter material alloyed on the base diffusion layer must, of course, have a specific resistance considerably lower than that of the base material). The signal sources are preferably connected to the emitters of the transistors, and the bases are through-connected.

Furthermore, the two transistors may then be united in a simple manner to form one transistor, which may mean a considerable advantage as to cost price and volume.

By the step according to the invention, it is achieved that the output is insensitive to small interfering voltages, while also less stringent requirements are imposed upon the exact push-pull of the two input signals, if both are present.

In order that the invention may be more readily carried into effect, several embodiments will now be described more fully, by way of example, with reference to the accompanying drawing, in which.

Figure 1:
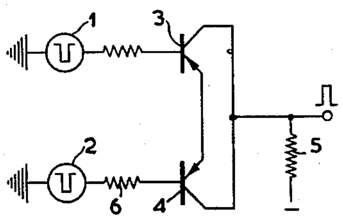
FIG. 1 shows one embodiment having the emitters through-connected.

Referring now to FIG. 1, two signal sources 1 and 2 are connected to the bases of transistors 3, 4 respectively. The emitters of the transistors are through-connected and their collectors are connected in common via an output resistor 5 to a source of supply as shown.

This device may serve to add information given in binary code in accordance with the algebra indicated by Boole. If neither signal source 1 nor 2 supplies an input pulse (information 0), a negligible current flows through output resistor 5, so that the output pulse is also negligible. However, if both signal sources supply approximately equal input pulses (information 1), then because of the fact that the emitters are at floating potential, no output pulses are produced, as is required according to the Boole algebra.

However, if the signal source 1 supplies a pulse, but the signal source 2 does not supply a pulse (or conversely), then, in accordance with the Boole algebra, an output pulse must be produced. According to the invention, this is achieved due to the fact that this input pulse is capable of overcoming the breakdown voltage of the emitter-base junction of transistor 4 (or transistor 3). The term "breakdown voltage" is to be understood in this case to mean that voltage which is required for the emitter-base path, which is active as a rectifier, to breakdown in the cut-off direction. The emitter-base path of transistor 4 thus breaks down and the emitter-base path of transistor 3 is then operated in the forward direction, so that current flows through the internal resistor 6 of source 2, the base-emitter path of transistor 4 and the emitter-collector path of transistor 3 to an output impedance 5.

The base-collector breakdown voltages must be so high that, under normal operating conditions, breakdown of the base-collector path does not occur. However, by utilising comparatively high-ohmic collector material on which a base diffusion layer of much lower specific resistance is formed, it may readily be achieved that the emitter-base breakdown voltage lies between 2 and 10 volts and is, for example, 4 volts but the collector-base breakdown voltage lies between 20 and 60 volts and is, for example, 40 volts. Input signals of, for example, 6 volts are in this case more than capable of exceeding said emitter-base breakdown voltage, while for a collector supply voltage of, for example, 30 volts breakdown of the collector-base path will not occur.

Figure 2:
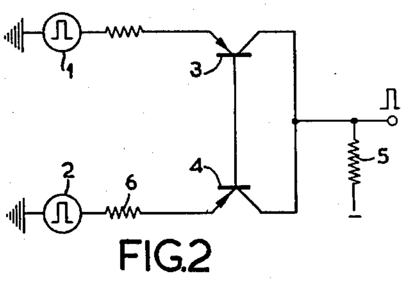
FIG. 2 shows one embodiment having the bases through-connected.

The variant shown in FIG. 2, wherein the inputs are connected to the respective emitters, is preferable to that of FIG. 1, since, if signal source 1 transmits a pulse and signal source 2 does not transmit a pulse, the current pulse flowing through the last-mentioned source 2 and the voltage drop set up across its internal resistor 6 is considerably less, viz. $\alpha'$x less, than in the case of FIG. 1, wherein $\alpha'$ represents the collector-base-current gain factor of transistor 3.

Figure 3:
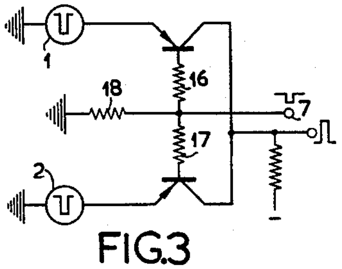
FIG. 3 shows a variant of FIG. 2.

Instead of using pulses corresponding to the forward direction of the emitter-base paths of the transistors, it is possible to utilise with similar effect pulses of opposite polarity, as may be seen from FIG. 3. By the use of signal sources 1 and 2 having negligible internal resistances and connecting the bases via resistors to each other (16, 17) and to earth (18) respectively, it is possible to derive from an output terminal 7 a pulse, the value of which is dependent upon whether both input signals are present or only one of them.

Figure 4:
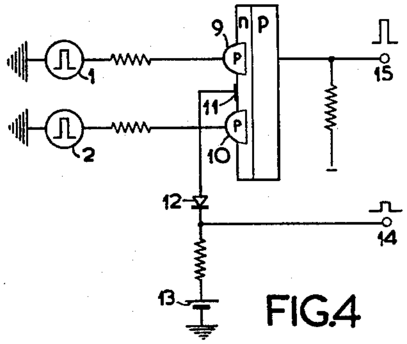
FIG. 4 shows one embodiment having the transistors combined into one element.

FIG. 4 shows the manner in which the two transistors may be united to form one element. Use is made of comparatively high-ohmic crystal, for example of p-conductivity type. By introducing this crystal into a vapour of a material producing donors upon diffusion into it, it is possible to obtain a thin surface layer of the n-conductivity type having a lower specific resistance. Two emitters 9 and 10 are provided on this surface layer, which is active as a base zone, by the alloying process. The specific resistance is so chosen that the emitter-base breakdown voltage is considerably less than the collector-base breakdown voltage and corresponds to the prescribed values at which the device must respond to the difference in voltage between the signals of the sources 1 and 2.

By providing also an ohmic contact 11 on the base zone *n*, it is possible to derive therefrom a pulse, if both sources 1 and 2 give off equal signal pulses, since in this case there is set up at base contact 11 a voltage equal to that of the two signal pulses and hence higher than the emitter-base breakdown voltage which would occur at base contact 11 if only one input signal were present. By leading the voltage at contact 11 through a rectifier 12 and a threshold voltage source 13 of a value a little higher than this breakdown voltage, a pulse is produced at an output terminal 14 only if the sources 1 and 2 each give off a signal.

This pulse may then serve as a carry pulse, that is to say in the addition 1+1=10, which is to be carried out in the binary numerical system, terminal 15 does not supply an output pulse and hence produces the 0 of the result 10, whereas terminal 14 produces an output pulse, viz the so-called carry pulse, corresponding to the 1 of the result 10.

Similarly, the pulse derived from the terminal 7 of FIG. 3 may be used as the carry pulse. The resistors 16 and 17 may in this case be constituted by the inner resistance of the base zone when use is made of a semi-conductive element as shown in FIG. 4. However, this involves the disadvantage that the voltage set up at the terminal 7 would have to be led through a threshold to be determined by the signal amplitude, in order to make unambiguous distinction between the desired pulse, if the sources 1 and 2 each give off a pulse, and the unwanted pulse, if only one of the sources 1 and 2 gives off a pulse and the other does not.

Figure 5:
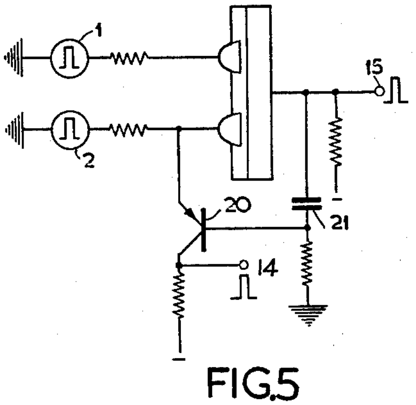
FIG. 5 shows a variant of FIG. 4.

However, this disadvantage does not occur in the device shown in FIG. 5, but now another difficulty is encountered, viz that according as more energy is derived from the terminal 14, the resultant base current gives rise to a larger interfering pulse at the terminal 15. Consequently, it will generally be preferred to design the semiconductive element without base connection, as shown in FIG. 5, and to produce the carry pulse with the aid of some "and"-circuit, for example an auxiliary transistor 20 as shown. The emitter of transistor 20 is connected to the one signal source 2 (or, if desired, via blocking rectifiers having the same direction of passage as the emitter, to each of the sources 1 and 2), its base being connected through a blocking capacitor 21 to the terminal 15, the voltage of which cuts-off the transistor 20 in the presence of only one input pulse.

What is claimed is:

1. A circuit arrangement for responding to the difference between two input signals, comprising two transistors of the same conductivity type, each transistor including an output electrode and two input electrodes, said output electrodes being directly connected together, an output terminal connected to said output electrodes, one corresponding pair of input electrodes being connected together through a D.C. connection, and means to apply input pulses to the remaining input electrodes, said input pulses having a polarity and a magnitude such that no output pulse is present at said output terminal except under the condition that the magnitude in the absolute sense of a pulse applied to one transistor exceeds, by a predetermined amount, that applied to the other transistor, said condition causing breakdown of the input electrode path of said other transistor and consequent operation of said one transistor in the forward direction.

2. In a circuit arrangement of the class described, a pair of junction transistors of the same conductivity type each comprising two input electrodes and a collector electrode, means connecting said collector electrodes directly together, an output terminal connected to said collector electrodes, means connecting one pair of corresponding input electrodes together through a D.C. connection, and two pulse sources, each connected to apply input pulses to the other of said input electrodes, said input pulses having a polarity and magnitude such that no output pulse is present at said output terminal except under the condition that the magnitude, in the absolute sense, of a pulse applied to one transistor exceeds, by a predetermined amount, that applied to the other transistor, said condition causing conduction of the input electrode path of said other transistor in the reverse direction and consequent conduction of the input electrode path of said one transistor in the forward direction.

3. A circuit arrangement for responding to the difference between two input signals, comprising two transistors of the same conductivity type, each transistor including a collector electrode, an emitter electrode and a base electrode, said collector electrodes being directly connected together and to an output terminal, said emitter electrodes being directly connected together, and means to apply input pulses to the base electrodes, said input pulses having of a polarity and magnitude such that no output pulse is present at said output terminal except under the condition that the magnitude, in the absolute sense, of a pulse applied to one transistor exceeds, by a predetermined amount, that applied to the other transistor, said condition causing breakdown of the base-emitter path of said other transistor and consequent conduction in the forward direction of the base-emitter path of said one transistor.

4. A circuit arrangement for responding to the difference between two input signals, comprising two transistors of the same conductivity type, each transistor including a collector electrode, an emitter electrode and a base electrode, said collector electrodes being directly connected together, said emitter electrodes being directly connected together, an output terminal connected to said collector electrodes, a first pulse input source, a second pulse input source, one end of said first pulse source being connected to the base electrode of one transistor, one end of said second pulse source being connected to the base electrode of the other transistor, a common connection between the other ends of said pulse sources, the pulses supplied by said pulse input sources having a polarity and a magnitude such that no output pulse is present at said output terminal except under the condition that the magnitude, in the absolute sense, of a pulse applied to one transistor exceeds, by a predetermined amount, that applied to the other transistor, said condition causing breakdown of the input electrode path of said other transistor and consequent operation of said one transistor in the forward direction.

5. A circuit arrangement for responding to the difference between two input signals, comprising two transistors of the same conductivity type, each transistor including a collector electrode, an emitter electrode and a base electrode, said collector electrodes being directly connected together and to an output terminal, said base electrodes being directly connected together, and means to apply input pulses to the emitter electrodes, said input pulses having a polarity and magnitude such that no output pulse is present at said output terminal except under the condition that the magnitude, in the absolute sense, of a pulse applied to one transistor exceeds, by a predetermined amount, that applied to the other transistor, said condition causing breakdown of the base-emitter path of said other transistor and consequent conduction in the forward direction of the base-emitter path of said one transistor.

6. A circuit arrangement for responding to the difference between two input signals, comprising two transistors of the same conductivity type, each transistor including a collector electrode, an emitter electrode and a base electrode, said collector electrodes being directly connected together and to an output terminal, said base electrodes being directly connected together, a first pulse input source, a second pulse input source, one end of said first pulse source being connected to the emitter electrode of one transistor, one end of said second pulse source being connected to the emitter electrode of the other transistor, a common connection between the other ends of said pulse sources, said pulse sources generating pulses have a polarity and magnitude such that no output pulse is present at said output terminal except under the condition that the magnitude in the absolute sense of a pulse applied to one transistor exceeds, by a predetermined amount, that applied to the other transistor, said condition causing breakdown of the input electrode path of said other transistor and consequent operation of said one transistor in the forward direction.

7. A circuit arrangement for responding to the difference between two input signals, comprising two transistors of the same conductivity type, each transistor including a collector electrode, an emitter electrode and a base electrode, said collector electrodes being directly connected together and to an output terminal, a first resistor connected to one base electrode, a second resistor connected to the other base electrode, said first and second resistors being connected to a junction point, a first pulse input source, a second pulse input source, one end of said first pulse source being connected to the emitter of one transistor, one end of said second pulse source being connected to the emitter of the other transistor, a common connection between the other ends of the pulse sources, a D.C. connection between said junction point and said common connection, the polarity and magnitude of the pulses generated by said pulse sources being such that no output pulse is present at said output terminal except under the condition that the magnitude in the absolute sense of a pulse applied to one transistor exceeds, by a predetermined amount, that applied to the other transistor, said condition causing breakdown of the input electrode path of said other transistor and consequent operation of said one transistor in the forward direction.

8. A circuit arrangement as claimed in claim 5, said collector electrodes being composed of a single block of material of one conductivity type, said base electrodes being composed of a single block of material of conductivity type different from said collector and being contigueous and in close contact with said collector at one end thereof, the emitter electrodes being of the same conductivity type as the collector and being embedded in the base electrode at a surface thereof remote from said collector.

9. A circuit arrangement as claimed in claim 8, further comprising a rectifier and a threshold voltage source connected in series between said base electrode and said means for applying input signals.

10. A circuit arrangement as claimed in claim 8, further comprising an additional transistor having a base electrode, an emitter electrode and a collector electrode, the emitter electrode of the additional transistor being connected to the means for applying input signals, the base electrode of the additional transistor being connected through a blocking capacitor to the collector of the first and second transistors, output signals being derived from the respective collector electrodes.

References Cited in the file of this patent

UNITED STATES PATENTS

| | | |
|---|---|---|
| 2,698,392 | Herman | Dec. 28, 1954 |
| 2,713,117 | Haegele | July 12, 1955 |
| 2,827,574 | Schneider | Mar. 18, 1958 |
| 2,872,593 | Henle | Feb. 3, 1959 |
| 2,874,293 | McMurren | Feb. 17, 1959 |
| 2,874,339 | Perlman | Feb. 17, 1959 |
| 2,879,411 | Faulkner | Mar. 24, 1959 |
| 2,880,331 | MacSorley | Mar. 31, 1959 |
| 2,883,313 | Pankove | Apr. 21, 1959 |